Jan. 3, 1939.   J. H. OLEXSY   2,142,800
FOOD BASTER
Filed March 7, 1938
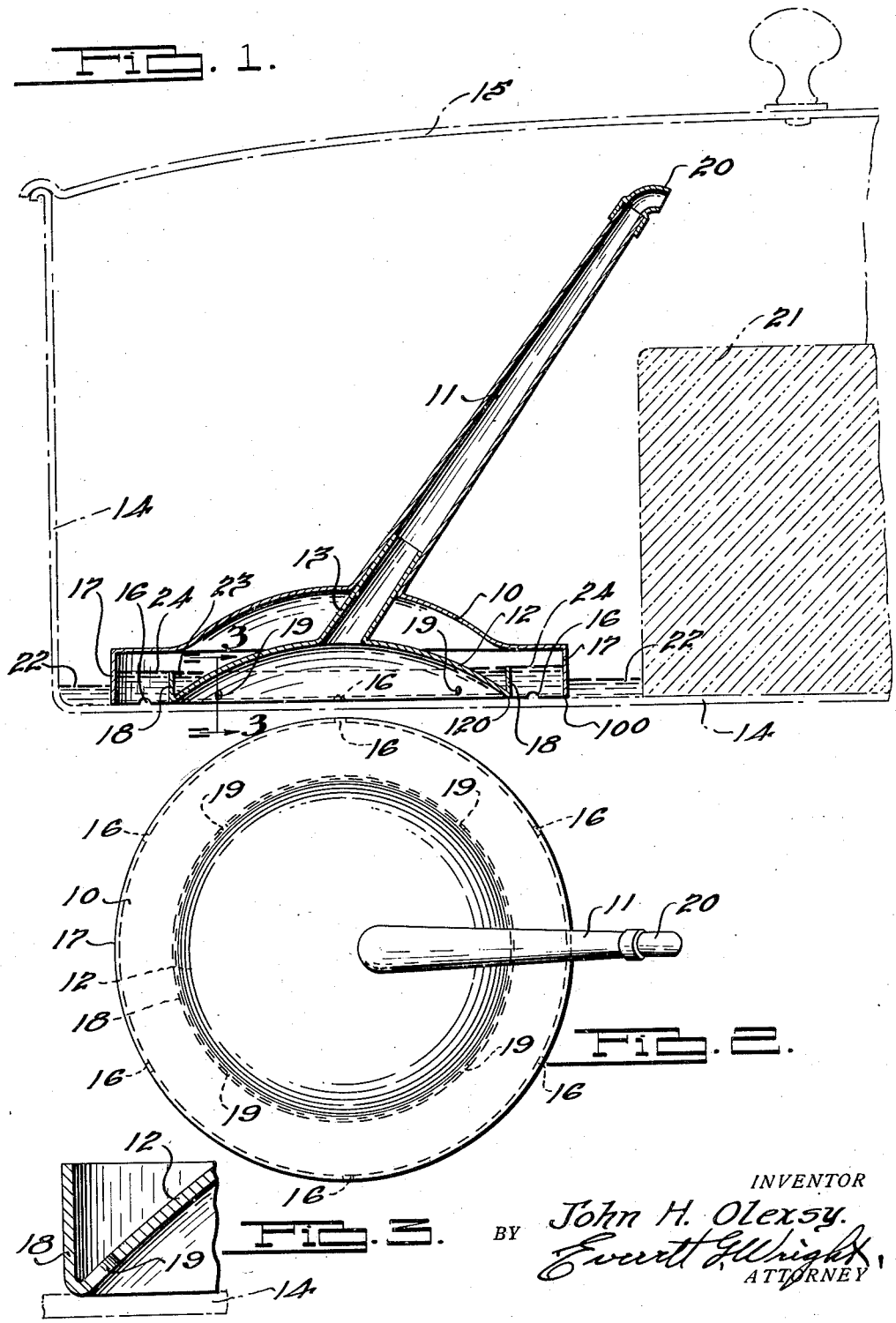
INVENTOR
John H. Olexsy.
BY Everett G. Wright
ATTORNEY Patented Jan. 3, 1939

2,142,800

UNITED STATES PATENT OFFICE 2,142,800

FOOD BASTER

John H. Olexsy, Detroit, Mich.

Application March 7, 1938, Serial No. 194,294

3 Claims. (Cl. 53—6)

This invention relates to food basters and in particular to means for constantly basting food while being cooked.

When foods are being cooked, the upper portions thereof become dehydrated and sometimes burned before being completely cooked throughout. This is especially true of roasts, fowl and the like. It has been customary to moisten foods being cooked by basting at frequent intervals which is preferably accomplished by bailing water or juices from the bottom of the pan in which the said food is being cooked and moistening the top and sides of the said food therewith.

The housewife's or cook's attention is often usurped by other duties and, when basting is omitted for a considerable period of time, the roast, fowl or food being cooked becomes dried out or burned.

With the foregoing in view, one object of this invention is to provide a food baster adapted to be placed in the same utensil in which food is being cooked which will constantly moisten the food while being cooked therein with water or juices from the bottom of the said utensil.

Another object of the invention is to provide an automatic food baster which will baste food with water or juices from the bottom of the utensil in which food is being cooked continually and as long as any water or juices remain in the bottom of the utensil.

Other objects of the invention will become apparent by reference to the following detailed description taken in connection with the accompanying drawing, in which:

Fig. 1 is a cross sectional view of a food baster embodying the invention shown positioned in a covered cooking utensil.

Fig. 2 is a plan view of the embodiment of the food baster disclosed in Fig. 1.

Fig. 3 is an enlarged detailed cross sectional view taken on the line 3—3 of Fig. 1.

Referring now to the drawing wherein like numerals refer to like and corresponding parts throughout the several views, the novel food baster disclosed therein comprises an outer vacuum cup 10 having a preferably tapered expelling spout 11 projecting upwardly therefrom, an expelling cup 12 positioned within the said vacuum cup 10 having a similarly tapered expelling spout 13 projecting upwardly therefrom and is preferably telescoped in hermetically sealed relationship within the lower end of the said expelling spout 11 of the said vacuum cup 10, the bottom peripheral edges 100 and 120 of the said vacuum cup 10 and expelling cup 12 respectively being in the same plane and, when in use, placed on the bottom of a cooking utensil 14 which may be provided with a suitable cover 15 if desired.

The said vacuum cup 10 is provided with a plurality of half round apertures 16 therethrough spaced around the periphery of the vertical side 17 thereof adjacent its depending edge 100 as best indicated in Figs. 1 and 2. The said expelling cup 12 has an upturned rim 18 therearound and is provided with a plurality of apertures 19 therethrough spaced around the periphery of the said cup 12 just inside the said upturned rim 18 thereof as best shown in Fig. 3.

The top of the said tapered expelling spout 11 may be provided with a preferably removable deflector 20 which is suitably formed to direct fluids from the said spout 11 laterally over food 21 in a shallow cooking utensil 14 if the cover 15 is not used. Where the utensil is covered the said deflector 20 may be removed and fluids expelled from the spout 11 would be thrown upward against the bottom of the cover of the utensil from whence the said fluids would be deflected downward over food being cooked therein.

In use, the food baster is positioned in a cooking utensil 14 alongside food 21 to be cooked therein, and a suitable amount of water is placed in the said utensil. The amount of water used in the utensil 14 being determined by custom and the experience of the cook, however, it is preferable that sufficient water be used to completely cook the food without replenishment.

The food baster will spray water and steam over the top of the food 21 until the last of the water in the bottom of the utensil 14 is used up when water confined in the expelling cup 12 is sufficiently hot to bubble into steam regardless of the height of the water in the utensil. For example, assume the height of the water in the utensil is below the top of the upturned rim 18 of the expelling cup 12 as indicated by the numeral 22 in Fig. 1, the boiling of the water under the expelling cup 12 first forms steam which forcibly expels water and steam vapor through the expelling spouts 13 and 11 over the food 21. The expelling of the water from under the expelling cup 12 momentarily drops the pressure therein and draws water into the said expelling cup 12 from the reservoir 23 around the periphery of the top of the said expelling cup 12 through the apertures 19 therethrough. The pressure within the vacuum cup 10 drops to a sufficient vacuum to raise the level of the water therein to the top of the upturned lip 18 of the expelling cup 12 as indicated by the numeral 24 in Fig. 1, at which level water is maintained just so long as there is any water whatsoever in the bottom of the utensil 14. Therefore, the water level of the reservoir 23 around the periphery of the top of the expelling cup 12 is constantly replenished within the said vacuum cup 10 by a surge of water admitted thereto intermittently through the half round apertures 16 therethrough immediately after each expulsion of water from the said expelling spout 13 due to a temporary raising of the level of the water 24 within the said vacuum cup 10 by a momentary comparatively high vacuum created therein.

Although the baster has been shown round in the drawing for convenience, and the spout has been shown straight and extending thereabove at a certain angle therefrom, it is contemplated that the device may be produced in other shapes and with the spout thereof extending thereabove at various angles therefrom. For example, the vacuum cup 10 and the expelling cup 13 may be made kidney shaped in order to occupy less room alongside the food 21 in the utensil 14.

The utensil is shown in the drawing as constructed of metal, however, it is contemplated that the device may be constructed of a heat resistant glass such as "Pyrex", in which event a suitable gasket must be employed between the inside of the expelling spout 11 and the outside of the expelling spout 13 telescoped in the said spout 11.

Although but one embodiment of the invention has been disclosed and described in detail, it will be understood that various changes including the size, shape, arrangement and detail of the parts thereof may be made without departing from the spirit of the invention, and it is not intended to limit the scope of the invention other than by the terms of the appended claims.

I claim:

1. A food baster comprising an outer vacuum cup and an inner expelling cup having the lower peripheries thereof in a common plane, an expelling spout from said expelling cup projecting in hermetically sealed relationship through said vacuum cup and extending thereabove, and an upwardly disposed lip around the periphery of the said expelling cup providing a reservoir around the top thereof, the top of the said expelling cup having a plurality of spaced apertures therethrough providing communication between said reservoir and the inside of the said expelling cup, the said vacuum cup being formed around the lower peripheral edge thereof to provide apertures through the bottom periphery thereof when the said food baster is positioned in the bottom of a utensil.

2. A food baster comprising a vacuum cup including an upwardly disposed spout therefrom, an expelling cup disposed in spaced relationship within the said vacuum cup including an upwardly disposed spout communicating with the spout of the vacuum cup telescoped in hermetically sealed relationship therein, and an upturned lip around the periphery of the said expelling cup forming a reservoir around the top thereof, the lower peripheral portions of the said vacuum cup and expelling cup being in the same plane, the said vacuum cup having a plurality of spaced apertures through the outer periphery thereof at the bottom thereof, the said expelling cup having a plurality of spaced apertures through the outer periphery of the top thereof providing communication between the bottom of the said reservoir and the inside of the said expelling cup.

3. A food baster comprising a vacuum cup formed with a vertical peripheral side and including an expelling spout extending upwardly from the said vacuum cup, an expelling cup disposed in spaced relationship within said vacuum cup including an expelling spout extending upwardly from said expelling cup telescoped in sealed relationship within the spout of the said vacuum cup, an upturned lip around the said expelling cup forming a reservoir around the top thereof, the top of the said expelling cup having a plurality of spaced apertures therethrough communicating between the lower inner periphery of the said reservoir and the inside of the said expelling cup, the said vacuum cup and expelling cup having the bottom peripheral edges thereof in the same plane, the said vacuum cup being formed to provide a plurality of spaced apertures through the bottom of the vertical peripheral side thereof when the said food baster is positioned in the bottom of a utensil, the said apertures through the vacuum cup and expelling cup being located in peripheral staggered relationship to each other.

JOHN H. OLEXSY.